United States Patent [19]

Feofanov et al.

[11] Patent Number: 4,655,895
[45] Date of Patent: Apr. 7, 1987

[54] APPARATUS FOR PURIFYING EFFLUENTS AND LIQUIDS

[75] Inventors: Vitaly A. Feofanov; Boris V. Pilat; Larisa P. Zhdanovich; Anatoly G. Romanenko; Boris S. Lukhanin; Oleg V. Donets; Valery P. Korobochkin, all of Alma-Ata, U.S.S.R.

[73] Assignee: Gosudarstvenny Nauchno-Issledovatelsky I Proektny Institut PO Obogascheniju Rud Tsvetnykh Metallov "Kazmekhanobr", Alma-Ata, U.S.S.R.

[21] Appl. No.: 719,288

[22] Filed: Apr. 3, 1985

Related U.S. Application Data

[62] Division of Ser. No. 433,234, Oct. 7, 1982, Pat. No. 4,525,254.

[51] Int. Cl.[4] .............................................. C02F 1/46
[52] U.S. Cl. .................................... 204/213; 204/249; 204/275; 204/DIG. 5
[58] Field of Search ............... 204/149, 150, 151, 152, 204/DIG. 13, 213, 249, 272, 275, 302, 304, 307, DIG. 5

[56] References Cited

U.S. PATENT DOCUMENTS

| | | | |
|---|---|---|---|
| 2,632,730 | 3/1953 | Brannan | 204/213 X |
| 3,915,820 | 10/1975 | Ito et al. | 204/149 |
| 3,964,991 | 6/1976 | Sullins | 204/149 X |
| 4,011,151 | 3/1977 | Ito et al. | 204/149 |
| 4,014,766 | 3/1977 | Watanabe et al. | 204/149 X |
| 4,145,268 | 3/1979 | Oehr | 204/149 |
| 4,280,887 | 7/1981 | Konstantouros | 204/150 |

Primary Examiner—G. L. Kaplan
Attorney, Agent, or Firm—Burgess, Ryan & Wayne

[57] ABSTRACT

The invention relates to the protection of the environment.

The invention may be most efficiently used for removing from aqueous media ions of heavy, non-ferrous and noble metals, organic substances, flotation reagents and petroleum products.

The process comprises dissolving a metal anode in the presence of a non-soluble cathode and precipitating organic and inorganic impurities on the resultant compounds. The precipitation is conducted using a cathode made of a material having a potential which is higher than the potential of the anode, the electrodes being alternately brought in contact with the air oxygen and the liquor being treated.

An apparatus for carrying out the process comprises a drum having openings for charging a metal scrap and the liquor being treated and for discharging the resultant precipitate. Wings are concentrically arranged on the inner surface of the drum. A perforated partition wall is provided adjacent to the outlet opening for preventing the loss of scrap from the drum.

The metal scrap charged into the interior of the drum is used as the soluble anode and is in contact with the cathode. The cathode may be in the form of the inner surface of the drum lined with copper.

17 Claims, 5 Drawing Figures

APPARATUS FOR PURIFYING EFFLUENTS AND LIQUIDS

This is a division of application Ser. No. 433,234 filed Oct. 7, 1982 and now U.S. Pat. No. 4,525,254.

The invention relates to the protection of environment in the area of activity of various production plants, and more particularly, it relates to process and apparatus for purifying effluents and recycle waters and for purifying solutions from various impurities.

The invention may be most advantageously used for removing ions of heavy, non-ferrous and noble metals, organic substances, flotation reagents and petroleum products from aqueous media.

The invention may be used in ferrous and non-ferrous metallurgy, in electrical engineering, chemical and petrochemical industries as well as in nuclear power production for removing radioactive impurities.

The requirements associated with the protection of environment become more and more stringent. The cost of preventing contamination of soil and water reservoirs with harmful impurities, increasing in volume with the development of the industrial production, is continuously growing.

Differences in properties of contaminating impurities such as ions of metals and organic substances call for the employment of special methods and sophisticated equipment for purifying aqueous media thus resulting in increased cost of protective measures. For these reasons, attention is drawn in various countries to the improvement of existing processes and equipment and to the development of new processes for the purification and conditioning of recirculation liquors.

Known processes for purifying effluents have a number of disadvantages. Liming effluents results in saturation of liquors being purified with calcium ions and requires additional purification to remove calcium and to lower excessive alkalinity; in addition, difficulties arise which are associated with the removal of metal hydroxides. Ion-exchange processes make it possible to achieve a high degree of purification of liquors from the majority of harmful impurities, but a problem of processing eluates is to be faced. In addition, the cost of purification proves rather high.

A method of electrocoagulation has recently come into use which makes it possible to effect purification of liquors from many impurities, but this method is associated with considerable energy consumption between 2 and 4 kW-h/m$^3$. The main mass of precipitates formed in carrying out the method is represented by iron hydroxide which it is difficult to settle and filter. The electrocoagulation purification is conducted in electrolyzers of various types. Electrocoagulation apparatus used in industry comprises a bath in which are mounted iron (less frequently aluminium) electrodes made of a sheet metal. To prevent passivation of anodes, the polarity of the electrodes is reversed by switching over the terminals of a d-c power supply source.

Known in the art is a process for purifying effluents in the electric field of a galvanic cell, wherein two electrodes made of metals are placed in the liquor being purified, the potential of one electrode being more positive than the potential of the other electrode. The negative metal is aluminium. The liquor being purified is caused to pass between the electrodes and is subjected to the action of the electric field of the open-circuited galvanic cell.

The advantage of this process resides in a lower consumption of electric energy and simpler process of purification. This process has, however, a number of disadvantages among which are large surface areas of the electrodes, passivation of the electrode surfaces during a long-term operation resulting in a lower efficiency of the purification process; besides, there is no possibility of changing the polarization and reversing the polarity of the electrodes, and polymeric amphoteric hydroxide precipitates are formed which are readily soluble in solutions of various compositions. The removal of precipitates is associated with serious difficulties.

A new method of ferrite purification of liquors has been recently proposed in Japan, which comprises producing precipitates of oxide magnetic iron compounds (ferrites) with their subsequent removal by filtering or magnetic separation.

These methods essentially reside in obtaining hydroxides or iron II or III or their mixtures within the volume of the liquor being purified, with their subsequent dehydration, the formation of the intermediate phase of iron hydroxides being the necessary step.

There are a large number of patents relating to various features of such method.

Known in the art is a process for electrolytically purifying effluents containing toxic metal impurities (cf. Japanese application No. 55-28753). In this process, an acid effluent is subjected to an electrolytic treatment using direct current and iron as the anode, and after the electrolytic treatment is completed, certain temperature conditions are provided and the pH of the water being treated is adjusted by adding an alkali to cause a ferritization reaction, whereafter, the liquor is aerated. Metal ions which are present in the liquor being treated are adsorbed with magnetite which is formed during aeration and which is isolated from the liquor being treated.

The disadvantage of this method resides in the need of optimizing the pH, increasing the temperature of the liquid being treated, subjecting the liquor to positive aeration and spending large quantities of electric energy for the anode dissolution of iron so that the field of application of the method is very limited. Re-neutralization of alkali and cooling of the liquor are required before discharging into water reservoirs.

Known in the art is another method for purifying effluents from heavy toxic metal ions (cf. Japanese application No. 55-3034). According to this method, an alkaline substance is added to the liquor being treated, and heavy metal ions are electrolytically oxidized by adding iron ions. As a result of the treatment, ferrite is formed which contains heavy toxic metal ions in its lattice. The resultant ferrite is isolated by the magnetic or other method. The disadvantage of the method resides in the need of adding an alkaline agent for the formation of hydroxides and in substantial electric energy consumption for treating the liquor being purified.

This method has the same disadvantages as the method for purifying effluents described above.

A modification of the above described method is a method for removing heavy metal ions from effluents developed by the firm Mitsubishi Petrochemical Co., which is based on the employment of soluble iron anodes and formation of difficultly soluble ferrites. This method was developed in detail for the purification of chromate-containing washing liquors of chrome-plating departments containing between 5 and 300 mg/l of chromium, 1–300 mg/l of phosphates and 15–200 mg/l of silicates.

The method is carried out in an electrolyzer of 1 m³ capacity in which 29 iron-plate electrodes 1 cm thick and with an area of 1 m² are placed in parallel (anodes and cathodes are installed in an alternating fashion). The electrolysis is conducted at 5–15 V and 1000–2000 A for 30 minutes. The energy consumption is between 2.5 and 15 kW-h per 1 m³ of the liquor being purified.

Known in the art is a method for electrolytically treating effluents containing toxic impurities (Japanese application No. 55-4476). According to this method, one electrode of the electrolyzer is made of iron and the other electrode is made of a difficulty soluble material. An acid phase being treated, which contains an additive in the form of sodium chloride, is fed to the electrolyzer.

At the first treatment stage the electrodes are connected to a power supply source in such a manner that the iron electrode is the anode and the difficulty soluble electrode is the cathode. After this treatment stage is completed, the pH and temperature of the liquor are adjusted for the ferrite formation reaction to occur. At the next treatment stage, the polarity of the electrodes is reversed, and iron ions are electrolytically oxidized with an increase in the temperature to the optimum value for the formation of ferrites, and magnetite is produced which adsorbs ions of harmful impurities with the formation of ferrites, whereafter the impurities are separated from the liquor being treated.

The disadvantage of the method resides in the need to add sodium chloride to the liquor being treated, adjust pH and temperature and reverse the polarity of the electrodes; in addition, the method is deficient in the long time required for the ferrite formation process and in substantial electric energy consumption for treating the liquor being treated. There is also the need in the secondary purification of the liquor from alkali and sodium chloride.

Therefore, the disadvantages which are in common for all abovedescribed methods for purifying effluents and liquors are as follows:

the need to provide conditions for the formation of iron hydroxides within the volume of the liquor being purified, which is achieved by adding appropriate reagents;

the need in subsequent oxidation of the hydroxides within the volume of the liquor, which is achieved by adjusting pH, raising the temperature and aerating;

long duration of the dehydration process and ferrite formation;

an increase in the salt content of the liquor being purified on the account of addition of sodium chloride and alkali;

substantial electric energy consumption because external current sources should be used for anode dissolution of iron.

It is an object of the invention to intensify the process for purifying effluents and liquors.

Another object of the invention is to improve the degree of purification of effluents and liquors.

Finally, it is an object of the invention to enlarge the range of purification of effluents and liquors as regards the value of pH and content of impurities.

These and other objects are accomplished by a process for purifying effluents and liquors, comprising dissolving a metal anode in the presence of a non-soluble cathode and precipitating organic and inorganic impurities on the resultant compounds. According to the invention, the precipitation is effected by using a cathode which is made of a material having the potential which is higher than the potential of the anode, the electrodes being alternately brought in contact with oxygen in the air and with the liquor being treated.

The process according to the invention makes it possible to effect purification of effluents in a single stage from impurities of various nature, with any initial concentration of impurities and within any range of pH without adding chemical reagents, while substantially lowering the electric energy consumption. The consumption of electric energy may be completely eliminated if necessary.

This is primarily achieved by the selection of the materials of the anode and cathode which function under short-circuit conditions. In operation the cathode material is not substantially consumed, and the anode is dissolved continuously, and there is no need to add sodium chloride, alkali and other reagents to the liquor.

The alternating contact between the electrodes of which one is made of a material with a higher potential ensures an intense dissolution of the anode, prevents it from being passivated and enables a high rate of the process. The alternating contact of the electrodes with oxygen in the air and with the liquor being treated makes it possible to conduct the purification process in the region of the double electric layer at the interface of solid, liquid and gaseous phases where ideal conditions are provided for the oxidation of reacting substances and impurities.

In one embodiment of the invention iron scrap is used as the soluble anode, and the cathode is in the form of graphite, the rate of dissolution and oxidation of iron being so high that the formation of oxide crystals exhibiting magnetic properties is completed directly during the purification process in the working zone of the apparatus. Metal ions are incorporated in the structure of the crystal lattice and form non-soluble compounds—ferrites. In addition, impurity ions may penetrate the crystal in the form of inclusion compounds (clathrates). Finally, finely dispersed fresh-formed crystals of iron oxides exhibit a large surface area with a high sorbtion capacity with respect to both inorganic and organic substances. The combination of all these properties provides for a high degree of purification of liquors from impurities having various properties. The resultant precipitates take a small volume owing to the crystalline form of iron oxides.

In another embodiment of the invention, iron and copper are used as the anode and cathode, respectively. The provision of the copper cathode eliminates its reaction with the liquor being purified. This embodiment of the process is preferred for the purification of liquid radioactive wastes and also in applications where it is necessary to avoid even minor sorption of impurities being removed.

In still another embodiment of the invention, aluminium and iron are used as the anode and cathode, respectively.

In an apparatus for carrying out the process, comprising a vessel for the liquor being treated in which are installed a soluble metal anode and a cathode of a non-soluble material, according to the invention, the vessel comprises a known per se rotary drum having inlet and outlet openings for admitting to the interior of the drum the liquor being treated and a metal scrap which is used as the soluble anode and which is in contact with the cathode made of a material with the potential which is higher than the potential of the anode, and for removing the resultant precipitate.

It is preferred that the inner surface of the drum be provided with concentric installed longitudinal wings.

The simple and reliable construction of the drum-type apparatus for carrying out the process according to the invention makes it possible to achieve any desired productivity of the purification process between several and tens of thousands m$^3$ per day.

The process according to the invention is further enhanced by the provision of longitudinally extending wings concentrically arranged on the inner surface of the apparatus drum so as to effect the alternating contact of the electrodes with air and liquor during rotation of the drum and to intensify the process of formation of oxide iron compounds and the process of purification of liquors from various impurities as a whole.

The provision of a perforated partition wall arranged in the interior of the drum at a distance of maximum ⅓ of the length thereof from the discharge opening prevents the scrap from being entrained toward the discharge opening.

The inner surface of the drum is preferably lined with a material used as the cathode, the potential of the material being higher than the potential of the anode. This construction of the apparatus improves the efficiency of the process of purifying liquors from various impurities owing to an increase in the ratio of the total area of the cathode material to the surface area of the soluble anode.

The cathode is preferably made of copper as the use of the cathode of the apparatus from other material such as graphite may result in a partial dissolution of the lining.

In one embodiment of the apparatus, the drum is provided with magnets which are arranged in the zone between the perforated partition wall and the outlet opening. The provision of the magnets hampers the loss of iron and contributes to the formation of larger crystals of the resultant precipitate.

In accordance with one embodiment of the invention, the drum is coaxially installed in a cylindrical casing having concentrically installed magnets on its outer surface, the casing and the drum being installed on support rollers in a bath filled with the liquor, the bath bottom being in the form of a segment which is coaxial with the cylindrical casing and having magnets of the same polarity as the magnets of the cylindrical casing.

This construction of the apparatus makes it possible to reduce the load on the support rollers to a great extent and to lower the consumption of electric energy for rotating the drum.

The wings are preferably made in the form of troughs with a concavity facing in the direction opposite to the direction of rotation of the drum, the apparatus having a pipe for feeding the liquor being treated to the troughs.

The wings made in the form of troughs with the concavity facing in the direction opposite to the direction of rotation of the drum are filled with the liquor being treated to develop a torque which lowers the consumption of electric energy for the drum drive.

The apparatus is preferably provided with a pair of water wheels arranged at the ends of the drum and rigidly connected thereto, the wheels being caused to rotate by the flow of treated liquor discharged from the apparatus.

The water wheels make it possible to dispense completely with the use of electric energy for the purification process according to the invention by using a difference in levels of the liquor being purified upstream and downstream the apparatus.

Other objects and advantages of the invention will become apparent from the following detailed description of various embodiments illustrated in the accompanying drawings, in which.

A process comprises dissolving a metal anode in the presence of a non-soluble cathode, the liquor being treated being caused to pass therebetween. The resultant compounds are precipitated by using a cathode made of a material having the potential which is higher than the potential of the anode, the electrodes being alternately brought in contact with the air oxygen and with the liquor being treated.

Figure 1:
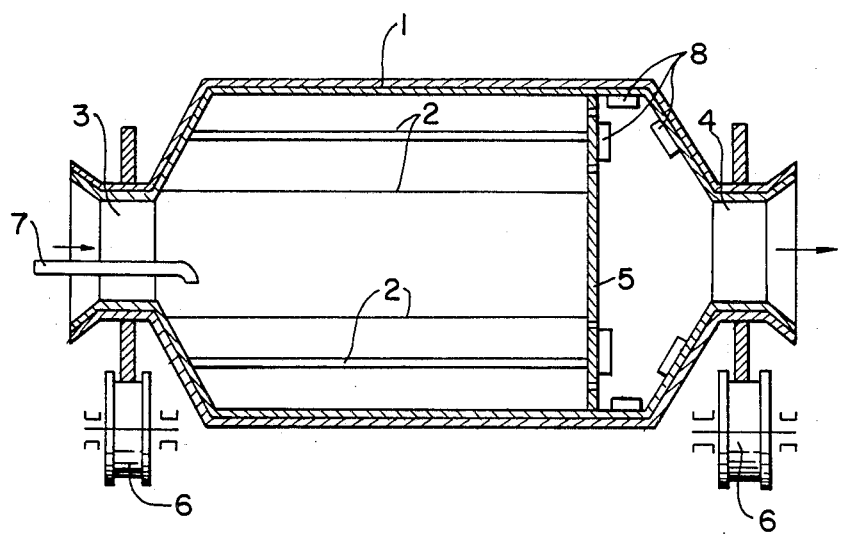
FIG. 1 is a longitudinal section of an apparatus for purifying effluents.

An apparatus for carrying out the process comprises a horizontal cylindrical drum 1 (FIG. 1) having wings 2 which are provided concentrically on the inner surface thereof. The drum 1 is provided at its ends with openings 3 for admitting to the interior of the drum 1 the liquor being treated and a mixture of a metal, e.g., iron scrap used as the anode and copper wastes used as the cathode and an outlet opening 4 for discharging from the drum 1 the resultant precipitate and treated liquor, respectively. A perforated partition wall 5 is installed in the diametrical plane of the drum 1 adjacent to the opening 4 at a distance therefrom which is maximum ⅓ of the length of the drum 1 so as to prevent the loss of scrap from the drum 1. The drum 1 is installed on support rollers 6 and is driven for rotation by means of an electric motor (not shown). A pipe 7 for admitting the liquor being treated to the interior of the drum 1 extends through the inlet opening 3. Magnets 8 are provided in the zone between the perforated partition wall 5 and the opening 4, on the inner surface of the drum 1 and on the partition wall 5.

The apparatus functions in the following manner.

The apparatus is charged with a mixture of a metal, e.g., iron scrap and copper wastes. A starting liquor is admitted to the interior of the drum 1 through the pipe 7 and the opening 3. When the drum 1 rotates, the iron is subjected to the anode dissolution due to its contact with the copper cathode. The rotation of the drum 1 contributes to a stirring of the scrap, the longitudinally extending wings 2 provided on the inner surface of the drum enabling the alternating contact of the scrap with air and liquor, the number of contacts being equal to the number of revolutions of the drum thereby intensifying the process of formation of iron oxide compounds. The magnets 8 prevent the loss of dispersed forms of iron compounds and contribute to the increase in their size. The starting liquor is discharged after the treatment through the opening 4 to a settling tank (not shown) wherefrom a part of the oxide iron compounds may be returned back to the apparatus for re-use if desired.

In one embodiment of the invention the cathode is made in the form of a copper lining of the inner surface of the drum 1. In this embodiment the apparatus functions in the same manner as described above.

Figure 2:
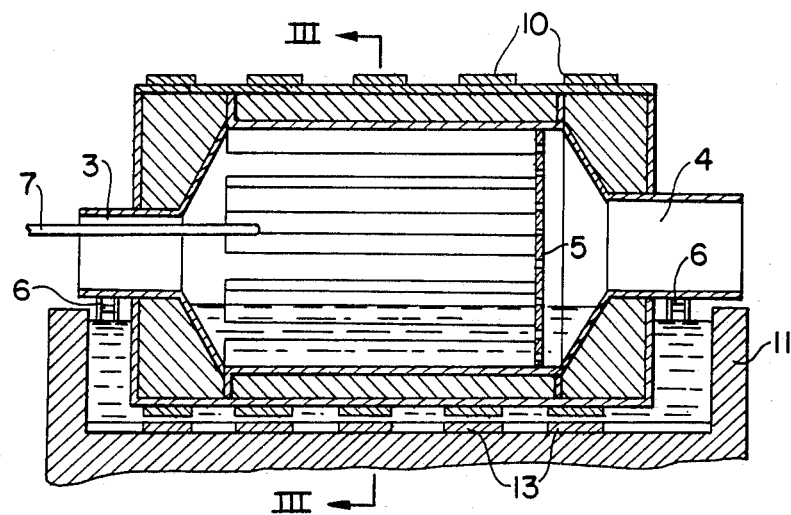
FIG. 2 is an embodiment of the apparatus (longitudinal section)
Figure 3:
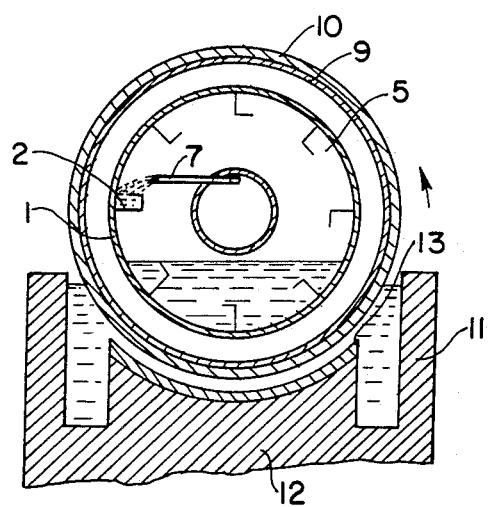
FIG. 3 is a sectional view taken along the line III—III in FIG. 2.

To lower the consumption of electric energy for rotation of the drum 1, the drum may be coaxially installed in a cylindrical casing 9 (FIGS. 2, 3). Magnets 10 are provided on the outer surface of the cylindrical casing 9 concentric with the casing. The casing 9 and the drum 1 are installed in a water-filled bath 11 having a bottom 12 in the form of a segment which is coaxial with the cylindrical casing 9 and has magnets 13 (FIG. 3) of the polarity identical with the polarity of the magnets 10 of the cylindrical casing 9. The wings 2 of the drum 1 are made in the form of troughs with the concavity facing in the direction opposite to the direction of rotation of the drum 1. The liquor being treated is fed to the troughs through the pipe 7.

The apparatus shown in FIGS. 2 and 3 functions in the following manner. The weight of the liquid in the trough participates in the development of a torque thus lowering the consumption of energy for rotating the drum 1. After filling the working zone of the apparatus, the purified liquor is fed through the opening 4 to a settling tank (not shown). Owing to the provision of the cylindrical casing 9 and magnets 10, 13 arranged on the casing 9 and on the bottom 12 of the bath 11, respectively, the main fraction of the weight of the movable part of the apparatus is compensated for thus lowering the load on the support rollers 6 thereby also reducing the consumption of electric energy for rotating the drum 1.

The cathode may be in the form of graphite lumps which are fed to the interior of the drum 1 together with iron scrap. When the drum 1 is rotated, the mixture of the iron scrap and graphite lumps is stirred by the wings 2 so as to provide for alternating contact of the electrodes with air and liquor being treated. When graphite is used as the cathode, there is no need to have the copper lining on the inner surface of the drum.

In order to dispense completely with the consumption of electric energy for carrying out the process according to the invention, an apparatus may be used which is provided with a pair of water wheels 14 (FIGS. 4, 5) arranged at the ends of the drum 1 and rigidly connected thereto. The bath 11 is provided with distribution troughs 15 and discharge troughs 16 for discharging the treated liquor and resultant precipitates.

Figure 4:
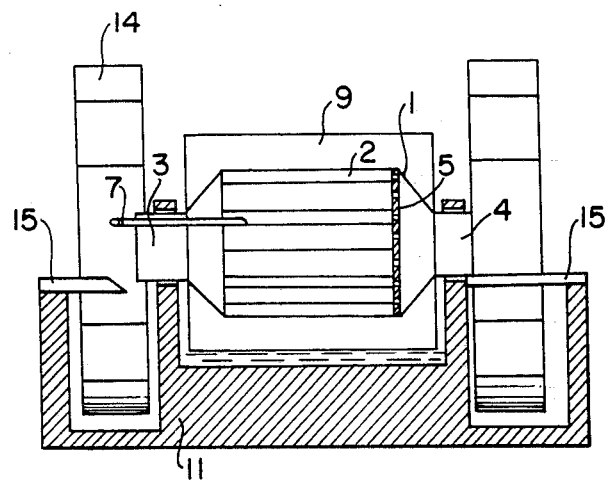
FIG. 4 is a longitudinal section of an apparatus having a hydraulic drive.
Figure 5:
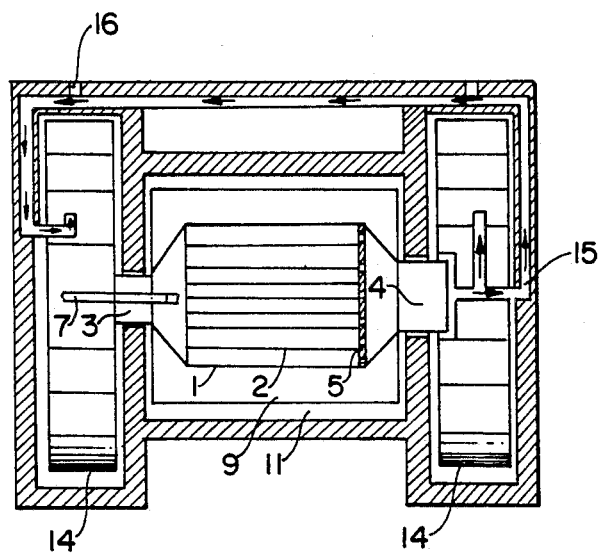
FIG. 5 is a plane view of the apparatus shown in FIG. 4.

The apparatus shown in FIGS. 4, 5 functions in the following manner.

The liquor being purified is admitted through the inlet opening 3. Having passed through the working zone of the apparatus, the liquor gets into the distribution trough 15 and to the water wheels 14 to drive the drum without electric energy consumption.

The metal scrap may be in the form of a mixture of aluminium and iron which functions as the anode and cathode, respectively, as iron has a more positive potential with respect to aluminium. The inner surface of the drum 1 may be lined with a dielectrical material such as fiber glass reinforced plastic.

The process according to the invention is carried out with equal efficiency in all embodiments of the apparatus.

Purification of effluents from various impurities within any range of pH and initial concentrations is achieved in a single stage without adding chemical reagents, while, at the same time, reducing the consumption of electric energy owing to the short-circuit between the anode and the cathode which is made of a material having a higher potential. The alternating contact of the electrodes with the liquor being purified and air prevents the anode from being passivated, provides for its intense dissolution and oxidation of reacting substances and impurities, intensifies the formation of ferrites and magnetic forms of iron compounds.

The formation of oxide crystals directly in the process of purification provides for an efficient removal of metal ions which are incorporated in the crystal lattice (ferrites) or penetrate its structure to form inclusion compounds (clathrates). Finely dispersed fresh-formed crystals have a large surface area and high sorption capacity with respect to both inorganic and organic substances. The combination of these properties provides for a high degree of purification of liquors from impurities with various properties.

EXAMPLE 1

A liquor containing 2.9 mg/l of zinc, 64 mg/l of calcium and 1.5 mg/l of lead was fed to the apparatus. The drum speed was 2–10 rpm. The impurities were precipitated continuously with a specific throughput capacity of 300 volumes per 1 volume of the working zone of the apparatus per day, the volume of the working zone being determined by the level of the liquor from the lower edge of the drum 1 to the discharge opening.

At an initial liquor temperature between 16° and 18° C. residual concentration of zinc was maximum 0.05 mg/l and the degree of purification was 98.8%.

At a temperature of the initial liquor between 35° and 40° C. the residual concentration of zinc was lowered to 0.03 mg/l, lead to 0.01 mg/l, the other conditions being equal; the degree of purification from these impurities was 99.9 and 99.3%, respectively. The same degree of purification was retained with an increase in the content of these impurities in the initial liquor up to 500 mg/l.

EXAMPLE 2

Industrial liquors obtained in the copper production were subjected to the purification. The range of concentration of arsenic was between 300 and 1000 mg/l; pH of the medium was 1.5–2.3.

The anode and cathode were made of iron and graphite, respectively, which were charged into the apparatus. The degree of purification of liquors from arsenic during 10 minutes was up to 99.7%. A longer processing time—up to 30 minutes—brought the degree of purification up to 99.95% with the residual arsenic content of maximum 0.2–0.3 mg/l.

EXAMPLE 3

Noble metals were recovered from liquors obtained in cyaniding gold- and silver-containing ore which contained gold - 3.6 mg/l; silver - 13.8 mg/l; zinc - 2.8 mg/l; cyanides -75.0 mg/l; pH=11.4. The anode and cathode were made of iron and copper, respectively. During the 30 minute test in the same apparatus the degree of extraction of silver and zinc was more than 98% and gold, 42%; an increase in the treatment time gave the gold precipitation rate of 70%.

When the discharge of the copper concentrate thickener (gold-containing liquor) was treated in the apparatus according to the invention for 30 minutes, the liquor containing gold - 0.92 mg/l; silver - 10.5 mg/l; zinc - 50.0 mg/l; total of cyanides and thiocyanates - 1187.5, the rate of precipitation of these components was 96.7;

99.1; 95.4%, respectively, and the concentration of thiocyanates and cyanides decreased by up to 83.2%.

EXAMPLE 4

The apparatus according to the invention was used for purifying effluents from organic flotation reagents and petroleum products. The anode and cathode were made of iron and copper.

In purifying liquors containing 48.2 mg/l of xanthogenate during 15 minutes of treatment the degree of purification was as high as 100%. The same rate of purification was obtained in removing emulsified kerosene: the degree of purification was 100% after 15 minutes of treatment with the kerosene content 336 mg/l.

With the initial kerosene content 6500 mg/l and greater the degree of purification was 99.8% during the 20 minute treatment.

The purification of liquors containing 76 mg/l of sodium oleate and 110 mg/l of alkyl sulphate paste took 40 minutes, with the degree of purification of 100 and 98.5%, respectively.

EXAMPLE 5

In purifying liquors from radioactive nuclides with an activity $6 \cdot 10^4$ Bq/l of zinc isotope 65 and $2 \cdot 10^5$ Bq/l of arsenic isotope - 73 the anode and cathode were made of iron and graphite and the treatment time in the apparatus according to the invention was 20 minutes, with the degree of purification 99.5 and 99.1%, respectively; the activity of the purified liquor was maximum 150 and 200 Bq/l, respectively.

We claim:

1. An apparatus for electrolytically purifying liquids by precipitating contaminants therefrom, said apparatus having at least one cathode and at least one anode and in which no current is applied from an external source, comprising a rotatable drum containing a mixture of pieces of anode and pieces of cathode material, said anode material having a more positive potential than the cathode material, said pieces of anode and cathode material being in variable contact with each other; an inlet opening in said drum to admit said liquids being treated and pieces of anode and cathode material to the interior thereof, and an outlet opening to discharge the treated liquid and the precipitated contaminants.

2. An apparatus according to claim 1, wherein there are provided shelves concentrically arranged on the inner surface of said drum.

3. An apparatus according to claim 2, wherein said shelves are made in the form of troughs with the concavity facing in the direction opposite to the direction of rotation of the drum, the apparatus having a pipe for admitting the liquor being treated to the troughs.

4. An apparatus according to claim 1, wherein the cathode is made of copper.

5. An apparatus according to claim 1, wherein the drum is provided with a transverse perforated partition wall which is arranged in the interior of the drum at a distance of maximum ⅓ of the drum length from the outlet opening.

6. An apparatus according to claim 5, wherein the drum is provided with magnets which are arranged in the zone between the perforated partition wall and the outlet opening.

7. An apparatus according to claim 1, wherein there is provided a cylindrical casing having magnets concentrically arranged on the outer surface thereof and said drum is coaxially installed in the interior of the casing, the casing with the drum being installed on support rollers in a bath filled with the liquor, the bottom of the bath being in the form of a segment coaxial with the cylindrical casing and having magnets of the same polarity as the magnets of the cylindrical casing.

8. An apparatus according to claim 1, wherein there are provided a pair of water wheels arranged at the ends of the drum and rigidly connected thereto, the wheels being caused to rotate by the flow of treated liquor discharged from the apparatus.

9. An apparatus for electrolytically purifying liquids to precipitate contaminants therefrom, comprising a rotatable drum having an anode and a cathode, without means for applying an external source of current to said anode and cathode, said anode being in the form of pieces of material, said cathode being a lining on the inner surface of the drum, said anode having a more positive potential than said cathode when both are exposed to said liquids, said drum further comprising an inlet opening for admitting said liquids to be treated and pieces of anode material to the drum interior and an outlet opening to discharge the treated liquid and precipitated contaminants.

10. An apparatus for electrolytically purifying liquids by precipitating contaminants therefrom, said apparatus having at least one cathode and at least one anode and in which no current is applied from an external source, comprising a rotatable drum containing a mixture of pieces of anode and pieces of cathode material, said anode material having a more positive potential than said cathode material, said pieces of anode and cathode material being in variable contact with each other; an inlet opening in said drum to admit said liquid being treated and pieces of anode and cathode material to the interior thereof, an outlet opening to discharge the treated liquid and the precipitated contaminants and a transverse perforated partition wall arranged in the interior of said drum at a distance not greater than one-third of the drum length from the outlet opening.

11. An apparatus according to claim 10, wherein there are provided shelves concentrically arranged on the inner surface of said drum.

12. An apparatus according to claim 11, wherein said shelves are made in the form of troughs with the concavity facing in the direction opposite to the direction of rotation of the drum, the apparatus having a pipe for admitting the liquid being treated to the troughs.

13. An apparatus according to claim 10, wherein the cathode is made of copper.

14. An apparatus according to claim 10, wherein the drum is provided with magnets which are arranged in the zone between the perforated partition wall and the outlet opening.

15. An apparatus according to claim 10, wherein there is provided a cylindrical casing having magnets concentrically arranged on the outer surface thereof and said drum is coaxially installed in the interior of the casing, the casing with the drum being installed on support rollers in a bath filled with the liquid, the bottom of the bath being in the form of a segment coaxial with the cylindrical casing and having magnets of the same polarity as the magnets of the cylindrical casing.

16. An apparatus according to claim 10, wherein there are provided a pair of water wheels arranged at the ends of the drum and rigidly connected thereto, the wheels being caused to rotate by the flow of treated liquid discharged from the apparatus.

17. An apparatus for electrolytically purifying liquids to precipitate contaminants therefrom, comprising a rotatable drum having an anode and a cathode, without means for applying an external source of current to said anode being in the form of pieces of material, said cathode being a lining on the inner surface of the drum, said anode having a more positive potential than said cathode when both are exposed to said liquids, said drum further comprising an inlet opening for admitting said liquids to be treated and pieces of anode material to the drum interior and an outlet opening to discharge the treated liquid and precipitated contaminants and a transverse perforated partition wall arranged in the interior of said drum at a distance not greater than one-third of the drum length from the outlet opening.

* * * * *